US012712323B2

(12) United States Patent
Yu et al.

(10) Patent No.: US 12,712,323 B2
(45) Date of Patent: Aug. 18, 2026

(54) PLUG CONNECTOR AND RADIO FREQUENCY CONNECTOR ASSEMBLY

(71) Applicant: ELECTRIC CONNECTOR TECHNOLOGY CO., LTD., Shenzhen (CN)

(72) Inventors: Huangsheng Yu, Shenzhen (CN); Xiaolin Lai, Shenzhen (CN); Xuyin Yin, Shenzhen (CN)

(73) Assignee: ELECTRIC CONNECTOR TECHNOLOGY CO., LTD., Shenzhen (CN)

( * ) Notice: Subject to any disclaimer, the term of this patent is extended or adjusted under 35 U.S.C. 154(b) by 309 days.

(21) Appl. No.: 18/699,420

(22) PCT Filed: Sep. 29, 2022

(86) PCT No.: PCT/CN2022/122728

§ 371 (c)(1),
(2) Date: Apr. 8, 2024

(87) PCT Pub. No.: WO2023/056888

PCT Pub. Date: Apr. 13, 2023

(65) Prior Publication Data

US 2024/0429664 A1 Dec. 26, 2024

(30) Foreign Application Priority Data

Oct. 8, 2021 (CN) ......................... 202122412432.1

(51) Int. Cl.
*H01R 24/40* (2011.01)

(52) U.S. Cl.
CPC .................................... *H01R 24/40* (2013.01)

(58) Field of Classification Search
CPC H01R 24/40; H01R 13/6592; H01R 13/6593; H01R 9/05

(Continued)

(56) References Cited

U.S. PATENT DOCUMENTS 6,203,369 B1 * 3/2001 Feldman ................ H01R 24/40 439/579
6,210,230 B1 * 4/2001 Lai ..................... H01R 13/6585 439/579

(Continued)

FOREIGN PATENT DOCUMENTS

CN 108155499 A 6/2018
CN 110957602 A 4/2020

(Continued)

OTHER PUBLICATIONS

European search report for European application No. 22877907.0, dated Jul. 14, 2025, 5 pages.

(Continued)

*Primary Examiner* — Gary F Paumen
(74) *Attorney, Agent, or Firm* — Dickinson Wright PLLC

(57) ABSTRACT

Provided are a plug connector and a radio frequency connector assembly. The plug connector includes a first insulating base including an insulating fitted portion and an insulating holding portion, a first signal terminal and a first shielding spacer that are disposed on the first insulating base, a first shielding housing disposed above the first insulating base, a second shielding housing disposed below the first insulating base and including a lower shielding frame and a lower shielding housing, and a shielding enhancement housing disposed between the first insulating base and the second shielding housing and including a front shielding plate, a connecting plate and a holding plate that are sequentially disposed, where the front shielding plate is connected to the insulating fitted portion, a width of the front shielding plate is greater than a thickness of the lower shielding frame, and the holding plate is connected to the insulating holding portion.

13 Claims, 9 Drawing Sheets

(58) Field of Classification Search
USPC ........................ 439/578, 582, 607.41, 607.47
See application file for complete search history.

(56) References Cited

U.S. PATENT DOCUMENTS

| | | | | |
|---|---|---|---|---|
| 6,830,478 | B1 * | 12/2004 | Ko | H01R 12/598 439/607.41 |
| 7,883,364 | B2 * | 2/2011 | Wu | H01R 13/6592 439/578 |
| 7,946,882 | B2 * | 5/2011 | Wu | H01R 13/648 439/607.41 |
| 2008/0050970 | A1 * | 2/2008 | Chang | H01R 12/725 439/607.41 |
| 2014/0065884 | A1 * | 3/2014 | Wu | H01R 13/6593 29/857 |
| 2014/0220821 | A1 * | 8/2014 | Wu | H01R 13/6461 439/607.41 |
| 2017/0162984 | A1 * | 6/2017 | Liao | H01R 4/023 |
| 2021/0057855 | A1 * | 2/2021 | Droesbeke | H01R 13/6593 |
| 2021/0305753 | A1 | 9/2021 | Wang et al. | |

FOREIGN PATENT DOCUMENTS

| | | | |
|---|---|---|---|
| CN | 211062980 | U | 7/2020 |
| CN | 111490408 | A | 8/2020 |
| CN | 214254926 | U | 9/2021 |
| CN | 216773710 | U | 6/2022 |
| CN | 217405792 | U | 9/2022 |
| JP | 2010157368 | A | 7/2010 |
| JP | 2019197684 | A | 11/2019 |
| JP | 2023037719 | A | 3/2023 |
| JP | 2024539758 | A | 10/2024 |
| WO | 2021225122 | A1 | 11/2021 |

OTHER PUBLICATIONS

Japanese Office Action for Japanese application No. 2024521137, with English Translation, dated May 27, 2025, 5 pages.

International Search Report and Written Opinion of PCT/CN2022/122728, mailing date Nov. 28, 2022, 6 pages.

* cited by examiner

PLUG CONNECTOR AND RADIO FREQUENCY CONNECTOR ASSEMBLY

This application is a national stage application filed under 35 U.S.C. 371 based on International Patent Application No. PCT/CN2022/122728, filed on Sep. 29, 2022, which claims priority to Chinese Patent Application No. 202122412432.1 filed with the China National Intellectual Property Administration (CNIPA) on Oct. 8, 2021, the disclosure of which are incorporated herein by reference in their entireties.

TECHNICAL FIELD

The present application relates to the technical field of electrical connectors, for example, a plug connector and a radio frequency connector assembly.

BACKGROUND

A radio frequency connector is generally attached to a cable or a device for the electrical connection of a wire conveying system. A radio frequency signal is widely used in the field of signal transmission due to advantages such as a wide frequency band and a strong anti-attenuation capability. With the development of communication technology, an increasingly high requirement is imposed on the shielding and anti-interference performance of the radio frequency connector.

The related art (Chinese Patent Publication No. CN211062980U) discloses a radio frequency connector male end assembly. The radio frequency connector assembly includes a first base, a shielding case, multiple first signal terminals and a spacer disposed between at least one group of adjacent first signal terminals. The spacer is used for dividing multiple shielding regions inside the shielding case. Signal terminals with high requirements for isolation are located in different shielding regions to improve the shielding performance of the connector male end assembly.

Disadvantage: in the case where the radio frequency connector male end assembly in the related art is used, situations such as electric field leakage and signal interference still exist, thereby seriously affecting the electrical performance of the radio frequency connector assembly.

SUMMARY

The present application provides a plug connector. The plug connector includes a first insulating base, two first signal terminals, a first shielding spacer, a first shielding housing, a second shielding housing and a shielding enhancement housing.

The first insulating base includes an insulating fitted portion and an insulating holding portion that are sequentially disposed.

The two first signal terminals are fixed on the first insulating base, where each of the two first signal terminals includes a first contact portion, a first connection portion and a first fixing portion that are sequentially disposed, where the first contact portion is fixed on the insulating fitted portion, and the first fixing portion is fixed on the insulating holding portion and configured to be fixedly connected to a coaxial cable.

The first shielding spacer is fixed on the first insulating base and disposed between the two adjacent first signal terminals.

The first shielding housing is disposed on an upper side of the first insulating base.

The second shielding housing is disposed on a lower side of the first insulating base and includes a lower shielding frame and a lower shielding housing.

The shielding enhancement housing is disposed between the first insulating base and the second shielding housing and includes a front shielding plate, a connecting plate and a holding plate that are sequentially disposed, where the front shielding plate is connected to the insulating fitted portion, a width of the front shielding plate is greater than a thickness of the lower shielding frame, and the holding plate is connected to the insulating holding portion.

The present application provides a radio frequency connector assembly. The radio frequency connector assembly includes the above plug connector and a socket connector.

The socket connector includes a second insulating base, two second signal terminals and a second shielding spacer that are disposed on the second insulating base and a third shielding housing disposed around on an outer side of the second insulating base.

When the plug connector is connected to the socket connector in a mated manner, an outer wall of the third shielding housing is connected to an inner wall of the lower shielding frame and the shielding enhancement housing, each of the two first signal terminals is in contact with a respective one of the two second signal terminals to implement electrical contact, and the first shielding spacer is connected to the second shielding spacer in the mated manner to form two shielding spaces where signal interference is prevented.

REFERENCE LIST

Figure 1:
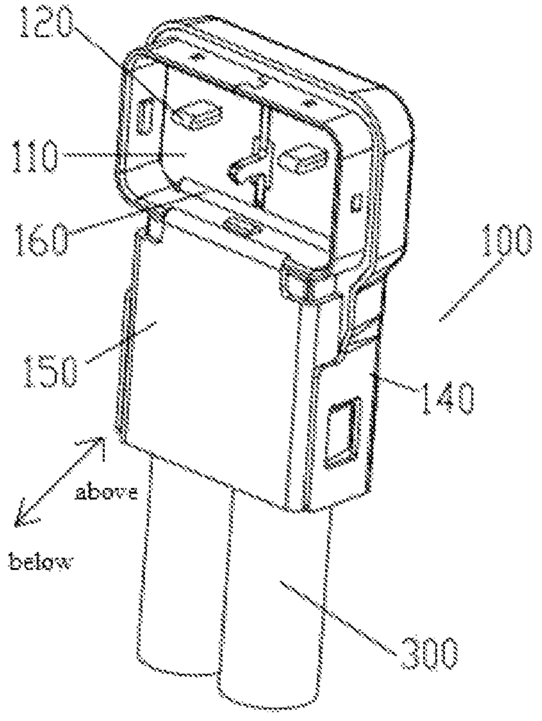
FIG. 1 is a structural diagram of a plug connector according to an embodiment of the present application.

100 plug connector
110 first insulating base

111 insulating fitted portion
1111 groove structure
1112 tab accommodating slot
112 insulating holding portion
120 first signal terminal
121 first contact portion
122 first connection portion
123 first fixing portion
130 first shielding spacer
131 shielding fitting segment
1311 fitting protrusion
132 connection enhancement groove
133 shielding holding segment
140 first shielding housing
150 second shielding housing
151 lower shielding frame
1511 detent protrusion
1512 fitting tab
152 lower shielding housing
160 shielding enhancement housing
161 front shielding plate
162 connecting plate
163 holding plate
1631 fixing tab
164 antenna structure
200 socket connector
210 second insulating base
211 first via structure
212 second via structure
213 tab inserting slot
220 second signal terminal
221 second contact portion
222 second connection portion
223 second fixing portion
230 second shielding spacer
231 upper holding surface
232 fitting slot
233 lower holding surface
240 third shielding housing
241 detent slot
242 edge protection structure
300 coaxial cable

DETAILED DESCRIPTION

In order that the preceding features, and advantages of the present application can be more apparent and easier to understand, examples of the present application are described below in detail in conjunction with drawings. Numerous specific details are set forth below to facilitate a thorough understanding of the present application. However, the present disclosure can be implemented in many modes different from the embodiments described herein, and those skilled in the art can make similar modifications without departing from the connotation of the present application, so the present application is not limited by the embodiments described below.

Embodiments of the present application provide a plug connector, thereby improving situations such as electric field leakage and signal interference existing in a radio frequency connector male end assembly in the related art. Herein, when the plug connector is mated with a socket connector, the orientation that the plug connector located on is an upper side or above, and the orientation that the socket connector located on is a lower side or below, that is, a side of the plug connector that can be mated with the socket connector is located on the lower side or below, and a side opposite to the side of the plug connector mated with the socket connector is located on the upper side or above. In the plug connector, an insulating fitted portion of a first insulating base is located on a front side or ahead relative to an insulating holding portion, and a direction opposite to the direction of insulating fitted portion relative to an insulating holding portion is a rear side or a back.

FIG. 1 to FIG. 8 illustrates an embodiment of the present application.

A plug connector 100 includes a first insulating base 110, two first signal terminals 120, a first shielding spacer 130, a first shielding housing 140, a second shielding housing 150 and a shielding enhancement housing 160. The first insulating base 110 includes an insulating fitted portion 111 and an insulating holding portion 112 that are sequentially disposed. The two first signal terminals 120 and the first shielding spacer 130 disposed between the two first signal terminals 120 are all disposed on the first insulating base 110. The first shielding housing 140 is disposed on an upper side of the first insulating base 110. The second shielding housing 150 is disposed on a lower side of the first insulating base 110. The shielding enhancement housing 160 is disposed between the first insulating base 110 and the second shielding housing 150. The two first signal terminals 120 and the first insulating base 110 are fixed together in an insert molding manner.

Each of the first two signal terminals 120 includes a first contact portion 121, a first connection portion 122 and a first fixing portion 123 that are sequentially disposed. The first contact portion 121 is disposed on the insulating fitted portion 111 and exposed on a surface of a lower side of the insulating fitted portion 111. When the plug connector 100 is mate with and connected to a socket connector 200, the first contact portion 121 is in contact with a second contact portion 221 to implement electrical connection. The first fixing portion 123 is disposed on the insulating holding portion 112 for being fixedly connected to a coaxial cable 300.

The second shielding housing 150 includes a lower shielding frame 151 and a lower shielding housing 152. The lower shielding frame 151 wraps an outer side of the insulating fitted portion 111. The lower shielding housing 152 covers a lower side of the insulating holding portion 112.

The shielding enhancement housing 160 includes a front shielding plate 161, a connecting plate 162 and a holding plate 163 that are sequentially disposed. The holding plate 163 is connected to the insulating holding portion 112, the front shielding plate 161 is connected to the insulating fitted portion 111, a width of the front shielding plate 161 is greater than a thickness of the lower shielding frame 151, and when the plug connector 100 is mate with and connected to the socket connector 200, a third shielding housing 240 is contacted with and connected to the front shielding plate 161 and the lower shielding frame 151.

Figure 6:
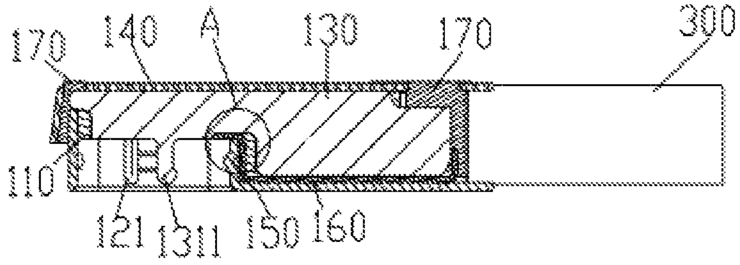
FIG. 6 is a sectional view of the plug connector shown in FIG. 1.
Figure 7:
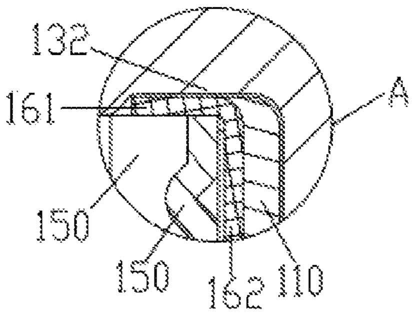
FIG. 7 is an enlarged view of a local section A in the sectional view shown in FIG. 6.
Figure 8:
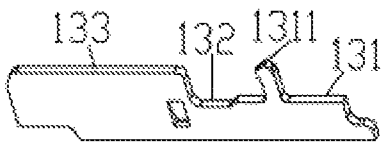
FIG. 8 is a structural diagram of a first shielding spacer in the plug connector shown in FIG. 1.
Figure 9:
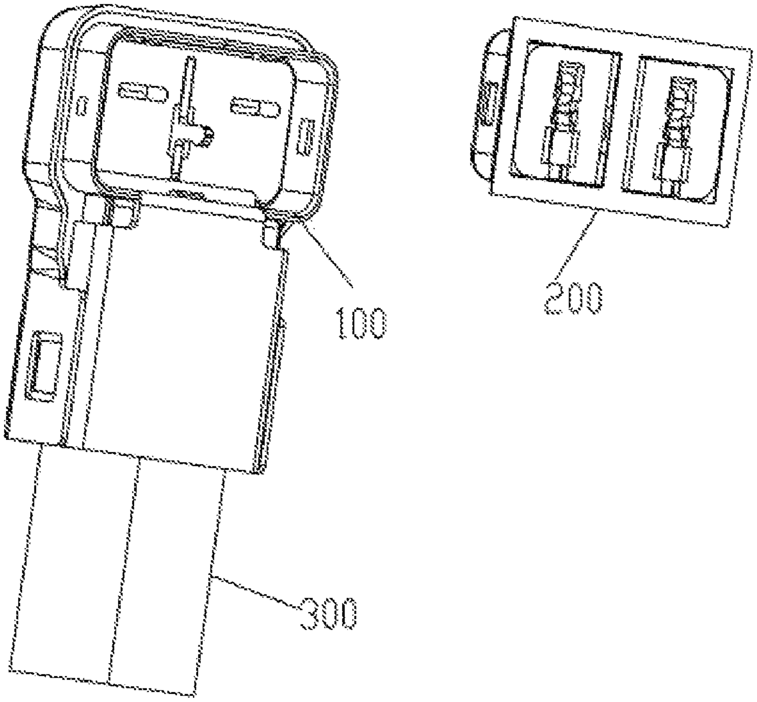
FIG. 9 is a structural diagram of a radio frequency connector assembly according to an embodiment of the present application.

In an embodiment, as shown in FIGS. 6 and 8, the first shielding spacer 130 includes a shielding fitting segment 131 and a shielding holding segment 133, the shielding fitting segment 131 is disposed on the insulating fitted portion 111, the shielding holding segment 133 is disposed on the insulating holding portion 112, a surface on an upper side of the shielding holding segment 133 is connected to the first shielding housing 140, and a surface on a lower side of the shielding holding segment 133 is connected to the shielding enhancement housing 160, thereby effectively preventing signal disturbance and interference in a process of transmitting radio frequency signals from two adjacent coaxial cables 300 to corresponding first signal terminals 120, respectively.

In an embodiment, a groove structure 1111 is disposed on a rear side of the insulating fitted portion 111, a connection enhancement groove 132 is disposed in the first shielding spacer 130, and the front shielding plate 161 is mate with and connected to the groove structure 1111 and the connection enhancement groove 132. As shown in FIGS. 4 to 8, the groove structure 1111 with the same thickness as that of the front shielding plate 161 is disposed on the insulating fitted portion 111, and the connection enhancement groove 132 is disposed between the shielding fitting segment 131 and the shielding holding segment 133 of the first shielding spacer 130. When the first shielding spacer 130 is installed on the first insulating base 110, the groove structure 1111 and the connection enhancement groove 132 jointly constitute a slot matched with the front shielding plate 161 in size. After the front shielding plate 161 is installed, a surface on a lower side of the front shielding plate 161 is flush with the surface of the lower side of the insulating fitted portion 111.

Figure 3:
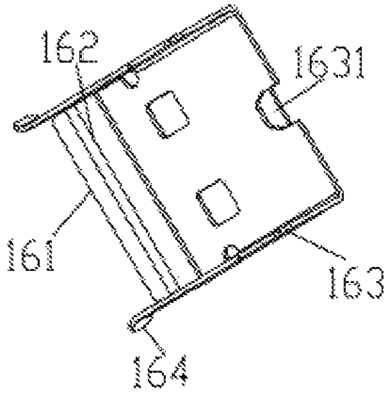
FIG. 3 is a structural diagram of a shielding enhancement housing in the plug connector shown in FIG. 1.
Figure 4:
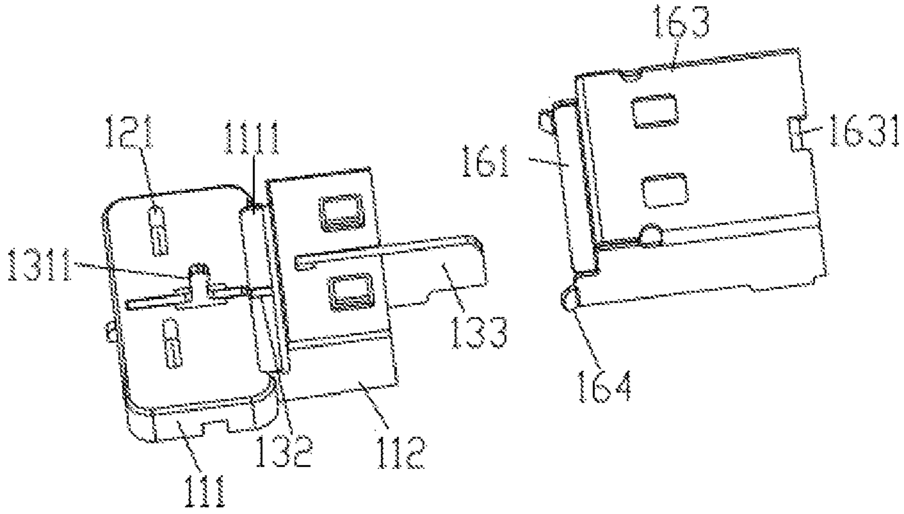
FIG. 4 is a structural diagram of the first insulating base, the first signal terminal, the first shielding spacer and the shielding enhancement housing shown in FIG. 2.
Figure 5:
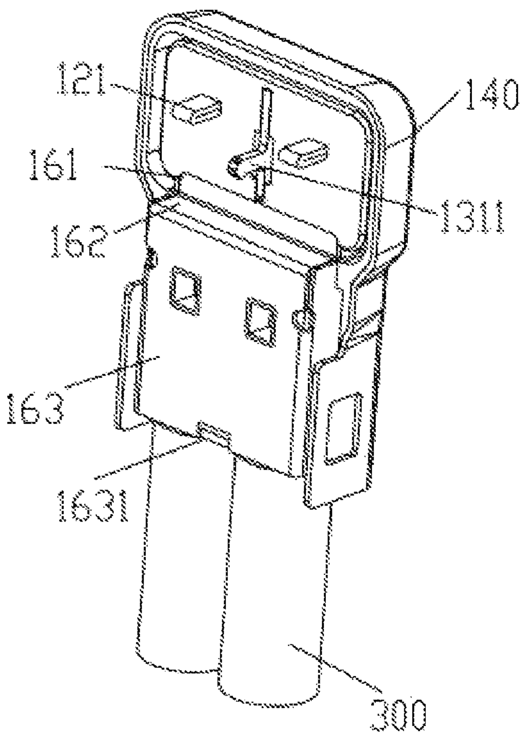
FIG. 5 is a structural diagram of the plug connector shown in FIG. 1 without a second shielding housing.

In an embodiment, as shown in FIGS. 3 and 4, the shielding enhancement housing 160 further includes antenna structures 164, the antenna structures 164 are clamped with a rear side of a sidewall of the insulating fitted portion 111. The antenna structures 164 are provided on the shielding enhancement housing 160 so that the shielding enhancement housing 160 is clamped with the first insulating base 110 and not easy to separate from the first insulating base 110 in a production process, which is conducive to improving production efficiency. In an embodiment, the antenna structures 164 are symmetrically disposed on two sides of the connecting plate 162, that is, lower sides of two sidewalls of the connecting plate 162 are extended forward, and the antenna structures 164 matched with the rear side of the sidewall of the insulating fitted portion 111 in shape are formed. The structures of the antenna structures 164 are simple and easy to process and produce.

Figure 14:
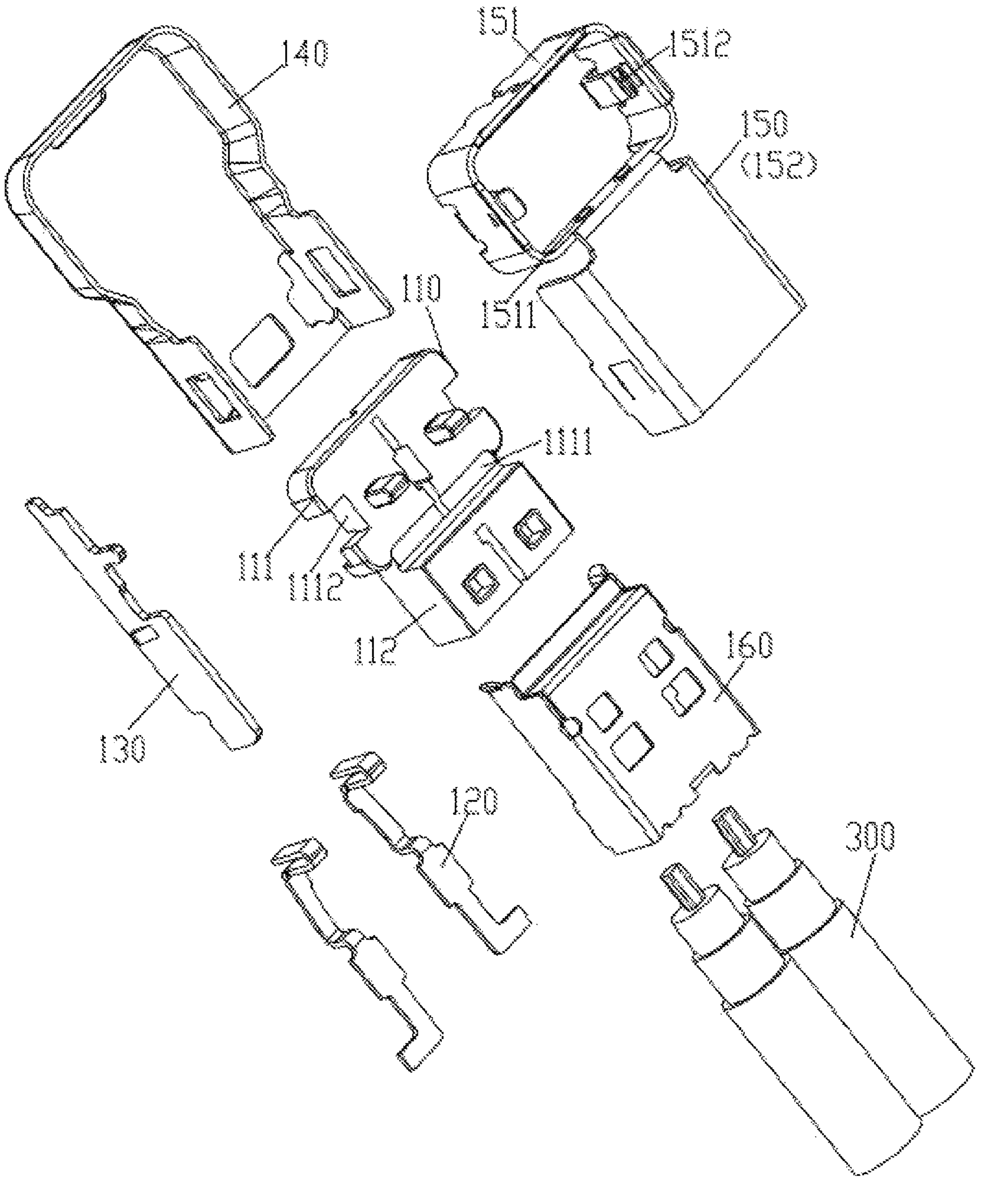
FIG. 14 is an exploded view of another plug connector according to an embodiment of the present application.
Figure 15:
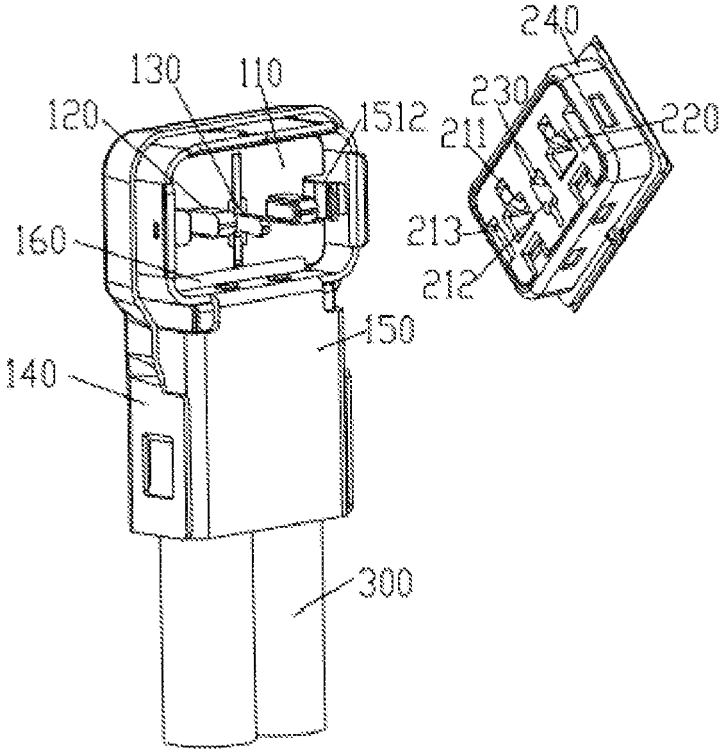
FIG. 15 is a structural diagram of another radio frequency connector assembly according to an embodiment of the present application.

In an embodiment, as shown in FIGS. 14 and 15, fitting tabs 1512 are disposed on inner sides of a pair of oppositely disposed sidewalls of the lower shielding frame 151 and used for enhancing fitting strength of the second shielding housing 150 and a socket connector. For example, ends on upper sides of the pair of oppositely disposed sidewalls of the lower shielding frame 151 are extended and bent downward in the inner direction of the lower shielding frame 151 to form the fitting tabs 1512, and tab accommodating slots 1112 for accommodating the fitting tabs 1512 are disposed on the insulating fitted portion 111 of the first insulating base 110. Tab inserting slots 213 are disposed on a second insulating base 210 of the socket connector 200. When a radio frequency connector assembly is used, the plug connector 100 is inserted into the socket connector 200. In this case, the fitting tabs 1512 are embedded in the tab inserting slots 213, and the third shielding housing 240 is located between the fitting tabs 1512 and the lower shielding frame 151 so that fitting strength of the plug connector 100 and the socket connector 200 are enhanced, a flexible plugging and unplugging capability of the radio frequency connector assembly is improved and an operator's handfeel of plugging and unplugging the plug connector is apparent.

In an embodiment, from an end on a lower side of the fitting tab 1512 to an upper side of the fitting tab 1512, a distance between the fitting tab 1512 and a plane where the sidewall of the lower shielding frame 151 provided with the fitting tab 1512 is located shows a general tendency of decreasing first and then increasing. At the end on the lower side of the fitting tab 1512, a distance between the fitting tab 1512 and the corresponding sidewall of the lower shielding frame 151 is relatively large so that it is easy to connect and plug the plug connector and the socket connector together due to an insertion guiding function of the fitting tab 1512. At a position close to the middle of the fitting tab 1512, a distance between the fitting tab 1512 and the corresponding sidewall of the lower shielding frame 151 is the smallest so that the operator's handfeel of plugging and unplugging is apparent, operating experience is improved and an insertion degree of the plug connector and the socket connector can be clearly understood.

In an embodiment, a fixing tab 1631 is disposed on the holding plate 163 for fixing the shielding enhancement housing 160. In an actual production process of the plug connector, the first shielding spacer 130, the first shielding housing 140, the second shielding housing 150 and the shielding enhancement housing 160 are fixed together through a tin soldering process. The fixing tab 1631 is disposed on the holding plate 163, thereby effectively increasing a welding area and improving the stability of a welding structure.

Figure 2:
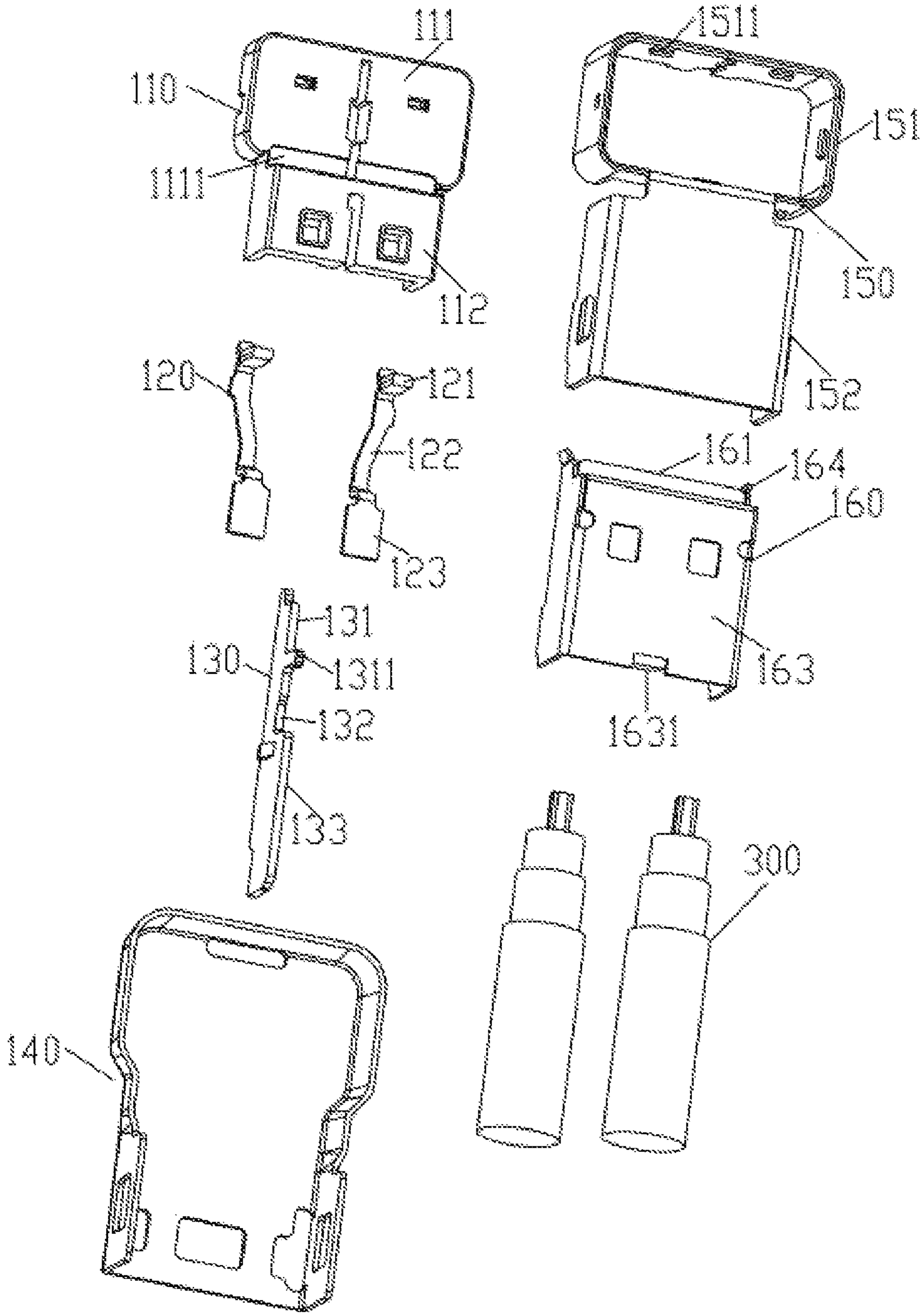
FIG. 2 is an exploded view of the plug connector shown in FIG. 1.

In an embodiment, an upper side of the insulating holding portion 112 and an upper side of the insulating fitted portion 111 are on the same surface, and a thickness of the insulating holding portion 112 is greater than a thickness of the insulating fitted portion 111. As shown in FIGS. 2 and 4, the first insulating base 110 has a stepped structure, and the insulating fitted portion 111 has a small thickness. After the plug connector is inserted into and mated with the socket connector, a corresponding portion of the entire radio frequency connector assembly also has a relatively small thickness, which is conducive to meeting a development requirement for the downsizing and miniaturization of a product at present.

In an embodiment, referring to FIG. 6, a solder paste for filling may be displayed as 170 for filling a gap between the first shielding spacer 130 and the first shielding housing 140 to form a closed full shielding.

As shown in FIGS. 9 to 13, this embodiment provides a radio frequency connector assembly. The radio frequency connector assembly includes any one of the above plug connectors 100 and a socket connector 200, where the socket connector 200 includes a second insulating base 210, two second signal terminals 220 disposed on the second insulating base 210, a second shielding spacer 230 disposed on the second insulating base 210 and located between the two second signal terminals 220 and a third shielding housing 240 disposed around an outer side of the second insulating base 210.

Figure 10:
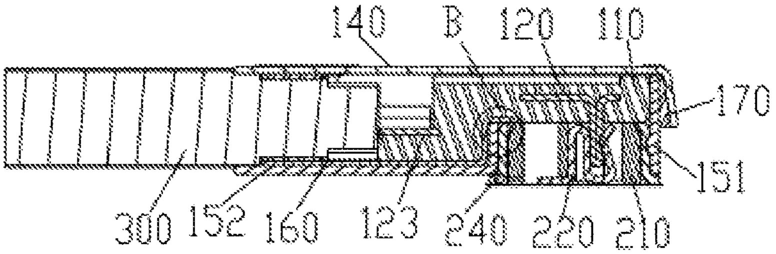
FIG. 10 is a sectional view of the radio frequency connector assembly shown in FIG. 9 in a mated state.
Figure 11:
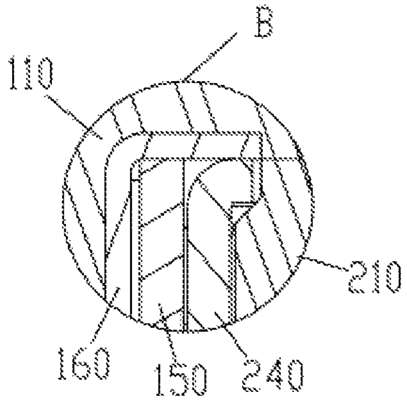
FIG. 11 is an enlarged view of a local section B in the sectional view shown in FIG. 10.

When the plug connector 100 is mated with and connected to the socket connector 200, as shown in FIGS. 10 and 11, an outer wall of the third shielding housing 240 is connected to an inner wall of the lower shielding frame 151 and the shielding enhancement housing 160 so that signal interference caused by radio frequency signal leakage can be effectively prevented, each of the two first signal terminals 120 is in contact with a respective one of the two second signal terminals 220 to implement electrical contact to transmit power and/or a signal, and the first shielding spacer 130 is mated with and connected to the second shielding spacer 230 to form two shielding spaces where signal interference is prevented.

In an embodiment, a fitting protrusion 1311 is disposed on the first shielding spacer 130, and a fitting slot 232 matched with the fitting protrusion 1311 is disposed on the second shielding spacer 230. When the plug connector 100 is mated with and connected to the socket connector 200, the fitting protrusion 1311 is mated with the fitting slot 232 to form the two shielding spaces where the signal interference is prevented.

Figure 12:
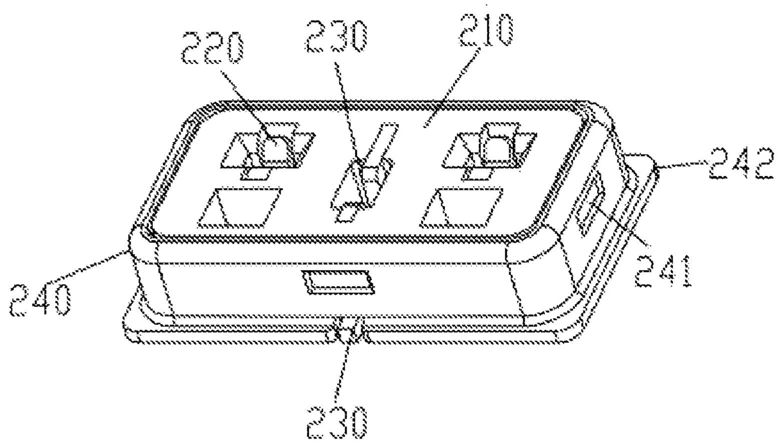
FIG. 12 is a structural diagram of a socket connector according to an embodiment of the present application.
Figure 13:
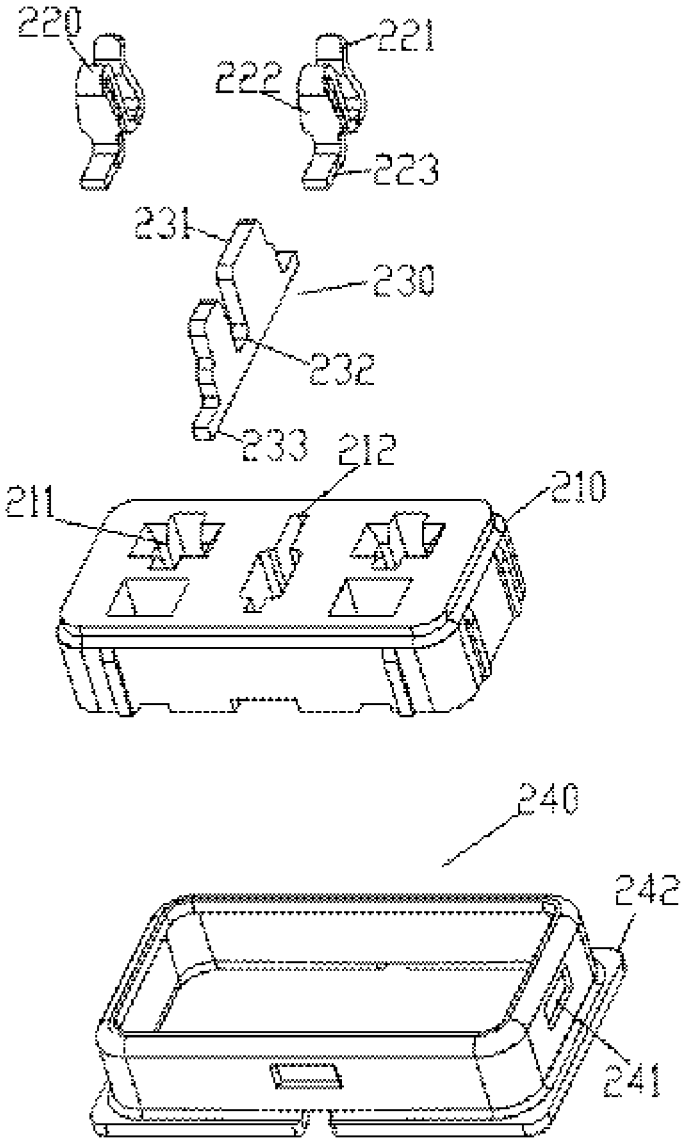
FIG. 13 is an exploded view of the socket connector shown in FIG. 12.

As shown in FIGS. 12 and 13, a first via structure 211 and a second via structure 212 are disposed on the second insulating base 210. Each of the two second signal terminals 220 includes a second contact portion 221, a second connection portion 222 and a second fixing portion 223. An upper holding surface 231 of the second shielding spacer 230 is flush with a surface on an upper side of the second insulating base 210. A lower holding surface 233 of the second shielding spacer 230 is flush with a surface on a lower side of the second insulating base 210. The fitting slot 232 matched with the fitting protrusion 1311 in size is formed downward on the upper holding surface 231. The second contact portion 221 is disposed in the first via structure 211. The fitting slot 232 is disposed in the second via structure 212.

In an embodiment, a detent protrusion 1511 is disposed on the inner wall of the lower shielding frame 151, a detent slot 241 is disposed on the outer wall of the third shielding housing 240, and when the plug connector 100 is mated with and connected to the socket connector 200, the detent protrusion 1511 is mated with and connected to the detent slot 241 to enhance insertion strength of the plug connector 100 and the socket connector 200, thereby improving the stability of the signal transmission of the radio frequency connector assembly.

In an embodiment, an edge protection structure 242 is disposed on an outer edge of a baseplate on a lower side of the third shielding housing 240.

In an embodiment, the first contact portion 121 is a double-layer fitting structure. In this case, the thickness of the first contact portion 121 is twice the thickness of another region. Compared with a common traditional signal terminal with a uniform thickness, since the thickness of the first contact portion 121 is twice the thickness of another region, a width of the first contact portion 121 may be reduced to about half of that of the common signal terminal to ensure an requirement for the same impedance (generally 50 ohms) of a transmission channel so that a distance between the two first signal terminals 120 is larger and a spacing distance is longer. Therefore, the first contact portion 121 has a better isolation effect of preventing the signal interference. In addition, since the first contact portion 121 is set to the double-layer fitting structure, when the first contact portion 121 is connected to the two second signal terminals 220 of the socket connector, the thickness of the first contact portion 121 increases so that a certain pressure is provided to a connecting surface between the two second signal terminals 220 and the first contact portion 121, thereby enhancing contact strength. The double-layer structure is set to be fitted, that is, no gap is between two branch spacers that form the double-layer structure, and no capacitance effect is formed, thereby preventing ahigh-frequency resonance phenomenon caused by a gap. Therefore, in the case where the first contact portion 121 is set to the double-layer fitting structure, not only can a shielding effect between the two plug signal terminals be improved, but also the high-frequency resonance phenomenon can be prevented. Moreover, the contact strength and connection stability of the two plug signal terminals and the two socket signal terminals in the socket connector can also be improved.

To improve the situations such as the electric field leakage and the signal interference existing in the radio frequency connector male md assembly in the related art, in the present application, the first shielding spacer and the shielding enhancement housing are disposed in the plug connector. When the plug connector is mated with and connected to the socket connector, the first shielding spacer is mated with the second shielding spacer in the socket connector to form the two shielding spaces where signals are prevented from interfering with each other, and the shielding enhancement housing and the second shielding housing are connected to the third shielding housing of the socket connector, thereby implementing fully closed shielding, reducing a radiation related to electromagnetic interference (EMI) and radio frequency interference, preventing radio frequency leakage and minimizing sensitivity to an external magnetic field. Therefore, the radio frequency connector assembly has excellent shielding performance, anti-interference capability and electrical performance.

The insert molding refers to a molding method in which a pre-prepared insert of an unconventional material is loaded into a mold and then the resin is injected, and the melted material and the insert are joined and solidified to form an integrated product.

The technical features of the preceding embodiments may be combined in any manner. For brevity of description, all possible combinations of the technical features in the preceding embodiments are not described. However, as long as the combinations of these technical features do not conflict, such combinations are to be construed as being within the scope of the specification.

The preceding embodiments are merely embodiments of the present application, and the specific and detailed description thereof cannot be construed as limiting the scope of the present disclosure. It is to be noted that for those having ordinary skill in the art, several modifications and improvements may further be made without departing from the concept of the present disclosure, and these modifications and improvements are within the scope of the present application. Therefore, the scope of the present application is defined by the appended claims.

What is claimed is:

1. A plug connector, comprising:

a first insulating base comprising an insulating fitted portion and an insulating holding portion (112) that are sequentially disposed;

two first signal terminals fixed on the first insulating base, wherein each of the two first signal terminals comprises a first contact portion, a first connection portion and a first fixing portion that are sequentially disposed, wherein the first contact portion is fixed on the insulating fitted portion, and the first fixing portion is fixed on the insulating holding portion and configured to be fixedly connected to a coaxial cable;

a first shielding spacer fixed on the first insulating base and disposed between the two adjacent first signal terminals;

a first shielding housing disposed on an upper side of the first insulating base;

a second shielding housing disposed on a lower side of the first insulating base and comprising a lower shielding frame and a lower shielding housing; and a shielding enhancement housing disposed between the first insulating base and the second shielding housing and comprising a front shielding plate, a connecting plate and a holding plate that are sequentially disposed, wherein the front shielding plate is connected to the insulating fitted portion, a width of the front shielding plate is greater than a thickness of the lower shielding frame, and the holding plate is connected to the insulating holding portion.

2. The plug connector according to claim 1, wherein the first shielding spacer comprises a shielding fitting segment and a shielding holding segment, wherein the shielding fitting segment is fixed on the insulating fitted portion, the shielding holding segment is fixed on the insulating holding portion, a surface on an upper side of the shielding holding segment is connected electrically to the first shielding housing, and a surface on a lower side of the shielding holding segment is connected to the shielding enhancement housing.

3. The plug connector according to claim 1, wherein a groove structure is disposed on a rear side of the insulating fitted portion, a connection enhancement groove is disposed in the first shielding spacer, and the front shielding plate is mated with and connected to the groove structure and the connection enhancement groove.

4. The plug connector according to claim 1, wherein the shielding enhancement housing further comprises antenna structures, wherein the antenna structures are clamped with a rear side of a sidewall of the insulating fitted portion.

5. The plug connector according to claim 1, wherein fitting tabs are disposed on inner sides of a pair of oppositely disposed sidewalls of the lower shielding frame and configured to enhance fitting strength of the second shielding housing and a socket connector.

6. The plug connector according to claim 1, wherein a fixing tab is disposed on the holding plate and configured to fix the shielding enhancement housing.

7. The plug connector according to claim 1, wherein an upper side of the insulating holding portion and an upper side of the insulating fitted portion are on a same surface, and a thickness of the insulating holding portion is greater than a thickness of the insulating fitted portion.

8. A radio frequency connector assembly, comprising the plug connector according to claim 1 and a socket connector, wherein:

the socket connector comprises a second insulating base, two second signal terminals and a second shielding spacer that are disposed on the second insulating base and a third shielding housing disposed around on an outer side of the second insulating base; and when the plug connector is mated with and connected to the socket connector, an outer wall of the third shielding housing is connected to an inner wall of the lower shielding frame and the shielding enhancement housing, each of the two first signal terminals is in contact with a respective one of the two second signal terminals to implement electrical contact, and the first shielding spacer is mated with and connected to the second shielding spacer to form two shielding spaces where signal interference is prevented.

9. The radio frequency connector assembly according to claim 8, wherein a fitting protrusion is disposed on the first shielding spacer, and a fitting slot matched with the fitting protrusion is disposed on the second shielding spacer.

10. The radio frequency connector assembly according to claim 8, wherein a detent protrusion is disposed on the inner wall of the lower shielding frame, a detent slot is disposed on the outer wall of the third shielding housing, and when the plug connector is mated with and connected to the socket connector, the detent protrusion is mated with and connected to the detent slot.

11. A radio frequency connector assembly, comprising the plug connector according to claim 2 and a socket connector, wherein:

the socket connector comprises a second insulating base, two second signal terminals and a second shielding spacer that are disposed on the second insulating base and a third shielding housing disposed around on an outer side of the second insulating base; and when the plug connector is mated with and connected to the socket connector, an outer wall of the third shielding housing is connected to an inner wall of the lower shielding frame and the shielding enhancement housing, each of the two first signal terminals is in contact with a respective one of the two second signal terminals to implement electrical contact, and the first shielding spacer is mated with and connected to the second shielding spacer to form two shielding spaces where signal interference is prevented.

12. The radio frequency connector assembly according to claim 11, wherein a fitting protrusion is disposed on the first shielding spacer, and a fitting slot matched with the fitting protrusion is disposed on the second shielding spacer.

13. The radio frequency connector assembly according to claim 11, wherein a detent protrusion is disposed on the inner wall of the lower shielding frame, a detent slot is disposed on the outer wall of the third shielding housing, and when the plug connector is mated with and connected to the socket connector, the detent protrusion is mated with and connected to the detent slot.

* * * * *